(12) United States Patent
Petrescu

(10) Patent No.: US 12,536,623 B2
(45) Date of Patent: Jan. 27, 2026

(54) ENHANCED GUIDING FOR CONVERGING DENOISERS

(71) Applicant: Maxon Computer GmbH, Bad Homburg (DE)

(72) Inventor: Lucian Petrescu, Bad Homburg (DE)

(73) Assignee: Maxon Computer GmbH, Bad Homburg (DE)

( * ) Notice: Subject to any disclaimer, the term of this patent is extended or adjusted under 35 U.S.C. 154(b) by 232 days.

(21) Appl. No.: 18/528,581

(22) Filed: Dec. 4, 2023

(65) Prior Publication Data

US 2024/0185400 A1 Jun. 6, 2024

Related U.S. Application Data

(60) Provisional application No. 63/430,277, filed on Dec. 5, 2022.

(51) Int. Cl.
| | |
|---|---|
| *G06T 5/70* | (2024.01) |
| *G06T 5/20* | (2006.01) |
| *G06T 5/60* | (2024.01) |
| *G06T 5/73* | (2024.01) |
| *G06T 15/06* | (2011.01) |
| *G06T 15/50* | (2011.01) |

(52) U.S. Cl.
CPC .............. *G06T 5/70* (2024.01); *G06T 5/20* (2013.01); *G06T 5/60* (2024.01); *G06T 5/73* (2024.01); *G06T 15/06* (2013.01); *G06T 15/50* (2013.01); *G06T 15/503* (2013.01); *G06T 15/506* (2013.01)

(58) Field of Classification Search
None
See application file for complete search history.

(56) References Cited

U.S. PATENT DOCUMENTS

| | | | |
|---|---|---|---|
| 10,269,100 B1 * | 4/2019 | Kopysov | G06T 11/001 |
| 11,302,069 B2 * | 4/2022 | Engel | G06T 15/08 |
| 12,198,307 B2 * | 1/2025 | Cséfalvay | G06T 15/005 |
| 2014/0193093 A1 * | 7/2014 | Rao | G06T 5/94 |
| | | | 382/261 |
| 2015/0016720 A1 * | 1/2015 | Vermeir | H04N 19/117 |
| | | | 382/167 |
| 2020/0034951 A1 * | 1/2020 | Zhu | G06T 7/90 |

\* cited by examiner

*Primary Examiner* — Jwalant Amin
(74) *Attorney, Agent, or Firm* — DLA PIPER LLP (US); Blake W. Jackson; Thomas J. Fuller

(57) ABSTRACT

The present embodiments generally relate to enhancing a quality of denoising in a real-time pathtracer. A pathtracer can implement a Monte-Carlo process, which can require many samples to converge to an error-acceptable result. Denoisers are often used in real-time (or near real-time), in order to accelerate the convergence process. The present embodiments further comprise systems and methods relating to an adaptive guidance algorithm to be implemented on top of various denoising algorithms (e.g., SVGF/ASVGF). The systems and methods as described herein can improve the gradient estimation quality, producing less blurry images. The systems and methods can also substantially assist many denoising algorithms in complicated illumination scenarios, which are common in CADs, such as indirect illuminated normal maps, specular paths, sharp specular reflections/refractions, very noisy direct illumination like dome lights, specular-specular sub-paths, sub surface scattering or hair, etc.

20 Claims, 8 Drawing Sheets

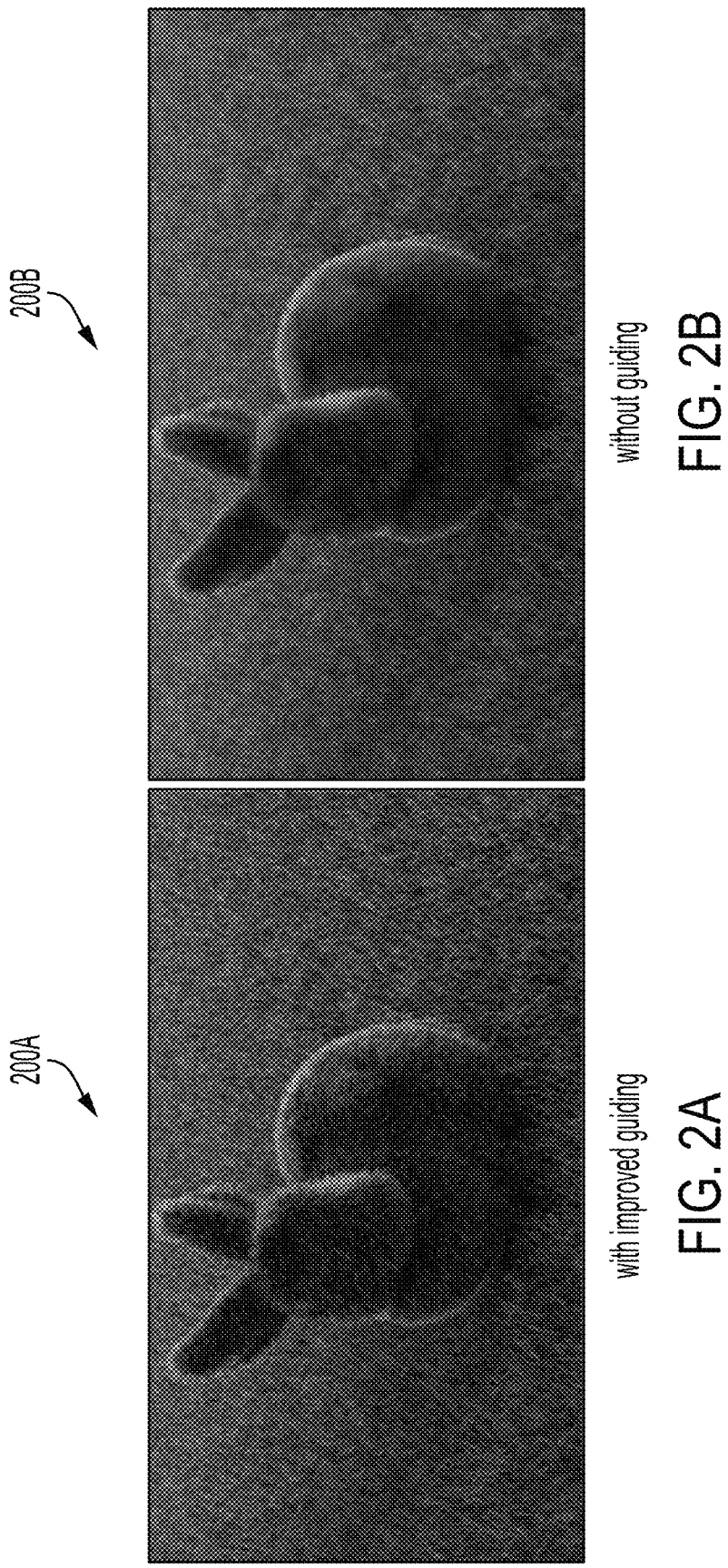

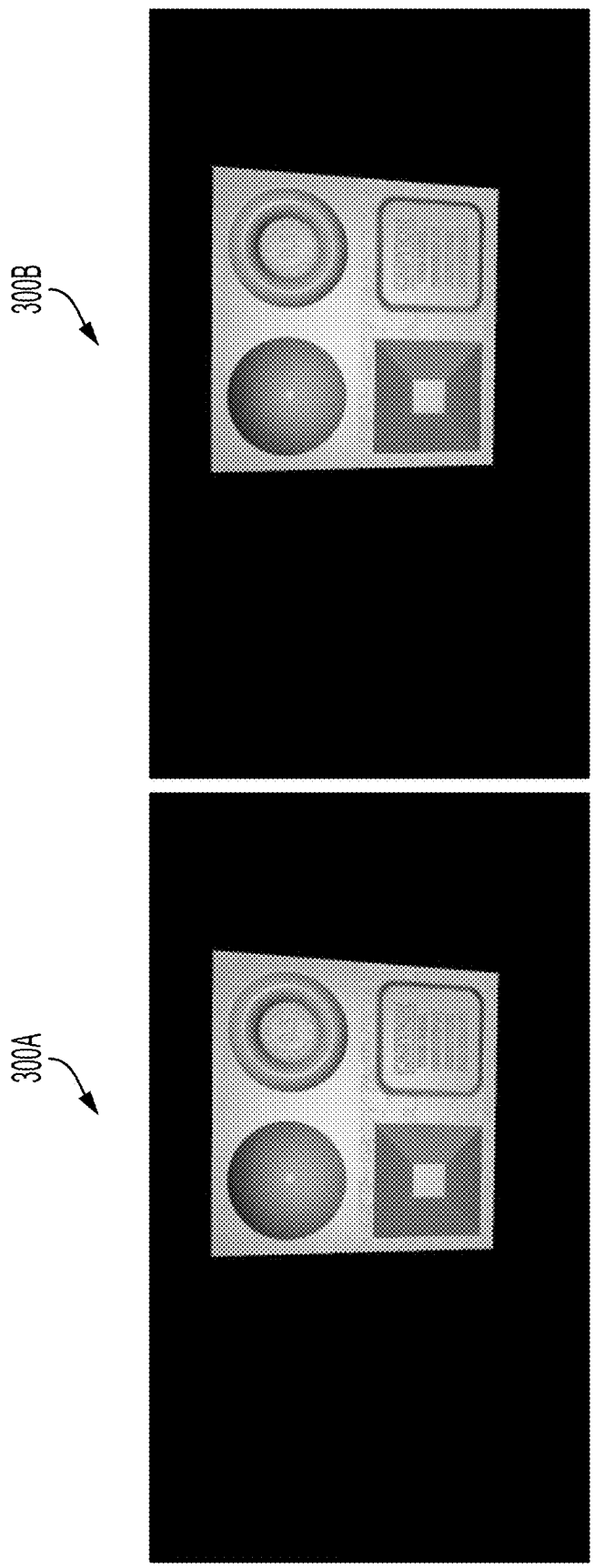
FIG. 3A with improved guiding
FIG. 3B without guiding

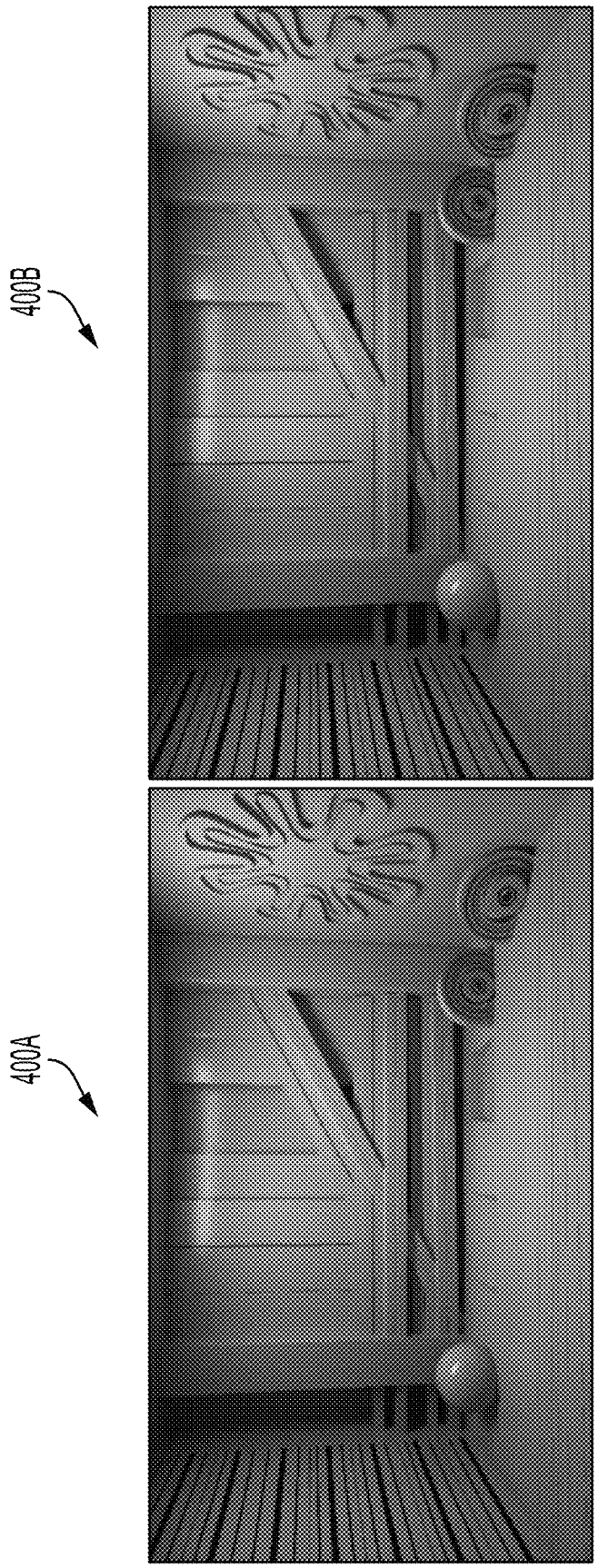

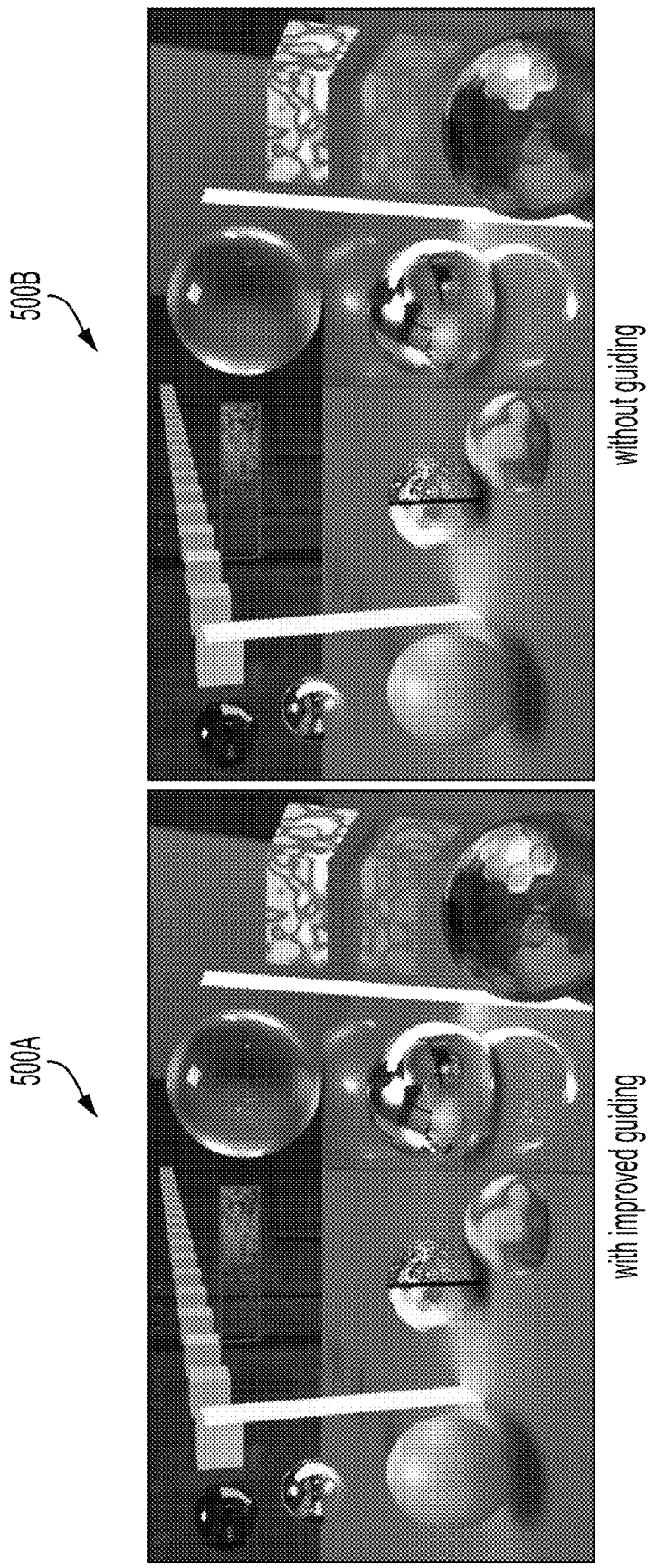

ENHANCED GUIDING FOR CONVERGING DENOISERS

CROSS-REFERENCE TO RELATED APPLICATION(S)

The present disclosure claims priority to U.S. Provisional Patent Application No. 63/430,277, titled "ENHANCED GUIDING FOR CONVERGING DENOISERS," and filed Dec. 5, 2022, the entirety of which is incorporated by reference herein.

TECHNICAL FIELD

The present disclosure relates to systems and methods for enhanced guiding for real-time (or near real-time) denoisers. More particularly, the present disclosure relates to systems and methods for enhanced guiding for converging denoisers such as spatiotemporal variance-guided real-time filters.

BACKGROUND

An image can be prepared and rendered on a computer or series of interconnected computers. Further, a software program can perform real time rendering features to accelerate the convergence process, so that visual feedback is returned faster. The present embodiments generally relate to images capable of being rendered by one or more computing devices. For instance, a software program executing on the computing device(s) can perform real-time (or near real-time) rendering of images at a very noisy level, which than can be very quickly converged with a fast real-time denoiser that can reduce or eliminate waiting time for rendering images.

The current state-of-the-art in real-time denoisers and filtering parametrizations can be in the family of spatiotemporal variance guided filters, which are described in "Gradient Estimation for Real-Time Adaptive Temporal Filtering" (A-SVGF, Schied, 2018) and in "Spatiotemporal Variance-Guided Filtering: Real-Time Reconstruction for Path-Traced Global Illumination" (SVGF, Schied, 2017) papers.

SUMMARY OF THE DISCLOSURE

In some embodiments, a computer-implemented method is provided. The computer-implemented method can include obtaining an initial image rendering to be processed to render a final image. The method can also include processing the initial image rendering to generate a series of unfiltered illuminations of the initial image rendering.

The method can also include the creation/rendering of initial channels to generate a series of features of additional image channels. In some instances, the features can comprise any of: surface and microsurface normals, a roughness, an object identifier, a material type and a position derivative.

In some instances, the guidance map is configured to support a high quality indirect illumination of one or more microsurfaces, as the guidance map is configured to signal that a high variance of any of the one or more microsurfaces does not need to be overblurred. In some instances, the guidance map is configured to prevent overbluring of dome-lights and other low quality direct illumination sources.

The method can also include generating a guidance map for the initial image rendering based on the series of the aforementioned features and on a metric describing the history quality between two consecutive temporal frames, which depends on the reprojection quality. The history quality can measure the confidence with which data from a previous frame can be reused into the current frame and can help retain data from previous frames even on the boundary of temporal disocclusion events. The guidance map can control a level of moderation of variance-based filtering. In some instances, the variance-based filtering comprises adaptive spatiotemporal variance-guided filtering (A-SVGF).

The guidance map can also be specialized for different types of materials, such as sub surface scattering (SSS) and hair. In some instances, this specialization can also be parametrized and controlled by a user.

The method can also include performing a variance-based filtering to the series of unfiltered illuminations using the guidance map to generate a series of filtered illuminations. In some instances, the series of unfiltered illuminations and/or the filtered illuminations comprise any of: a direct illumination, an indirect diffuse illumination, and an indirect specular illumination.

The method can also include combining the series of filtered illuminations to generate the final image. In some instances, the final image filtered using the guidance map comprises a lower blurriness relating to any final image filtered without using the guidance map.

In another example embodiment, a system is provided. The system can include one or more processors and one or more non-transitory processor readable storage devices comprising instructions which, when executed by the one or more processors, cause the one or more processor to perform operations. The operations can include obtaining an initial image rendering that includes information relating to unfiltered illuminations and features. The features can comprise any of: surface and microsurface normals, a roughness, an object identifier, a material type, and a position derivative. The operations can include generating a history quality metric, based on the series of features. The operations can also include generating a guidance map for the initial image rendering based on the series of the features and on the previously generated history quality metric. The guidance map can control the level of moderation of variance-based filtering.

The operations can also include performing a variance-based filtering to the series of unfiltered illuminations using the guidance map to generate a series of filtered illuminations. The operations can also include combining the series of filtered illuminations to generate a final image.

In some instances, the variance-based filtering comprises adaptive spatiotemporal variance-guided filtering (A-SVGF).

In some instances, the series of unfiltered illuminations and/or the filtered illuminations comprise any of: a direct illumination, an indirect illumination, and an indirect specular illumination.

In some instances, the final image filtered using the guidance map comprises a lower blurriness relating to any final image filtered without using the guidance map.

In some instances, the guidance map is configured to support a high-quality indirect illumination of one or more microsurfaces, as the guidance map is configured to signal that a high variance of any of the one or more microsurfaces does not need to be overblurred.

In some instances, the guidance map is configured to prevent overblurring of dome-lights and other low quality direct illumination sources.

In some instances, the guidance map is configured to be disabled and enabled.

In some instances, the guidance map is configured to speed up a convergence rate of sub surface scattered materials.

In another example embodiment, one or more non-transitory computer-readable media are provided. The media can comprise instructions which, when executed by one or more processors, cause the one or more processors to perform operations. The operations can include obtaining an initial image rendering to be processed to render a final image. The initial image rendering can include information relating to unfiltered illuminations and features. The operations can include generating a history quality metric based on the series of features. The operations can also include generating a guidance map for the initial image rendering based on the series of the features and on the history quality metric, the guidance map controlling a level of moderation of variance-based filtering.

The operations can also include performing a variance-based filtering to the series of unfiltered illuminations using the guidance map to generate a series of filtered illuminations. The operations can also include combining the series of filtered illuminations to generate the final image.

In some instances, the series of unfiltered illuminations and/or the filtered illuminations comprise any of: a direct illumination, an indirect illumination, and an indirect specular illumination.

In some instances, the final image filtered using the guidance map comprises a lower blurriness relating to any final image filtered without using the guidance map.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A-2B illustrate a first example image with and without guiding as described herein.

FIGS. 3A-3B illustrate a second example image with and without guiding as described herein.

FIGS. 4A-4B illustrate a third example image with and without guiding as described herein.

FIGS. 5A-5B illustrate a fourth example image with and without guiding as described herein.

DETAILED DESCRIPTION

Figure 1A:
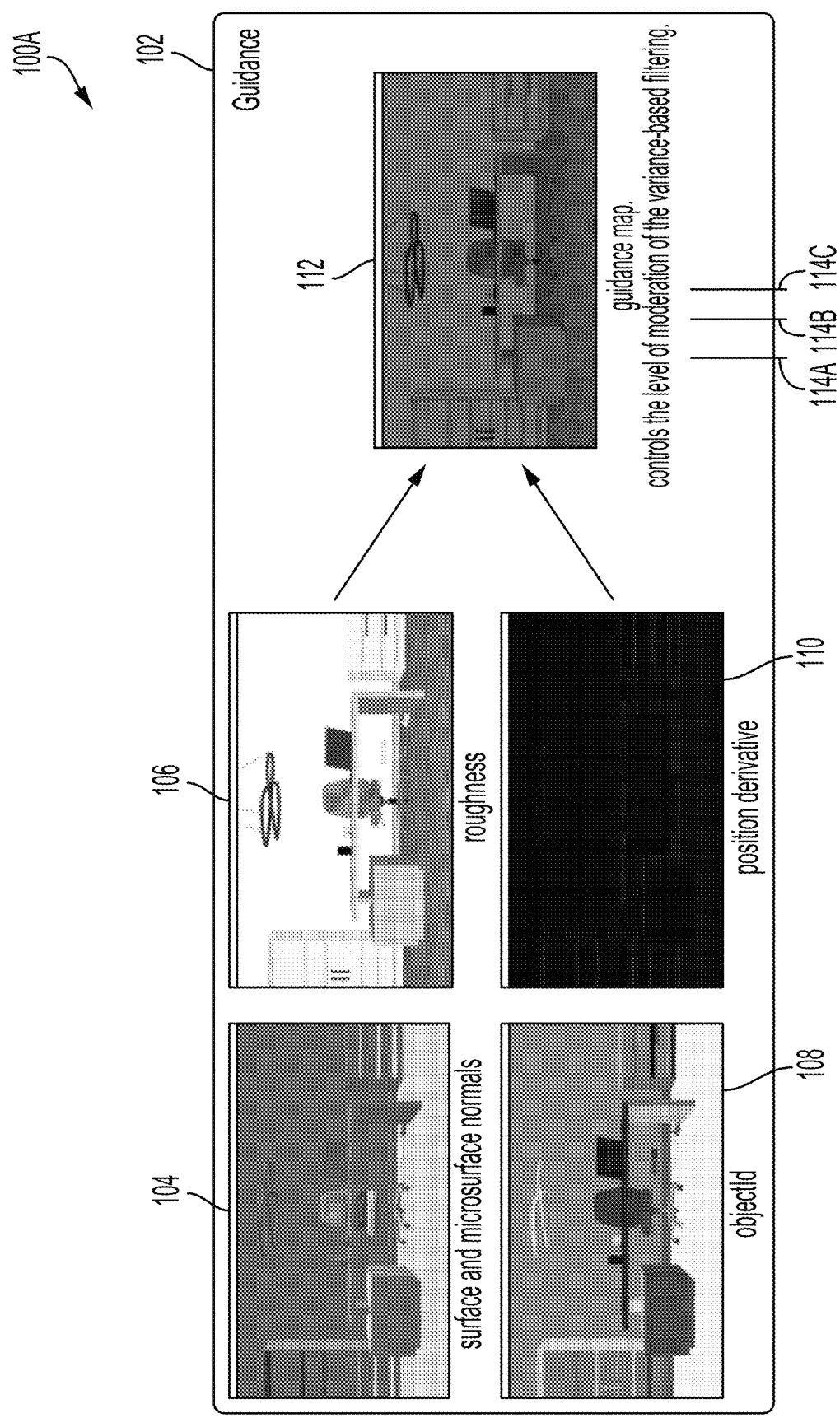
FIGS. 1A-1B illustrate a process for rendering a final image by a filtering algorithm and a guidance algorithm.

An image can be prepared and rendered on a computer or series of interconnected computers. Further, a software program can perform real time (or near real-time) rendering features that can limit or remove 3D artists from having to wait for rendering the images. The present embodiments generally relate to images capable of being rendered by one or more computing devices. For instance, a software program executing on the computing device(s) can perform real-time (or near real-time) rendering of images that can reduce or eliminate waiting time for rendering images.

The current state-of-the-art in real-time denoisers and filtering parametrizations can be in the family of spatio-temporal variance guided filters, which are described in "Gradient Estimation for Real-Time Adaptive Temporal Filtering" (A-SVGF, Schied, 2018) and in "Spatiotemporal Variance-Guided Filtering: Real-Time Reconstruction for Path-Traced Global Illumination" (SVGF, Schied, 2017) papers.

A primary drawback with such real-time denoisers and filtering parametrizations is that they are designed to strongly over-blur, as their main target is the game-style path tracing. They can be designed to prioritize fast convergence even in scenarios where there is not enough information to decide if blurring is the better filtering approach. This can make these designs suboptimal candidates for computer-aided designs (CADs), where precision is at a premium. For example, an algorithm such as (A-)spatio-temporal variance guided filtering (SVGF), can be oriented towards games implemented on a computer, where light transport is permissive and over blurring is acceptable but can produce far too blurry results in the context of the precision expected from a CAD. No matter how much parametrization is added to these methods, the methods may be unable to produce crisp images in many CAD illumination scenarios (e.g., dome lights, normal-mapped indirect illumination, poorly placed area light, etc.). While many machine learning based techniques, such as "Neural Temporal Adaptive Sampling and Denoising" (Hasselgren, 2020), have shown promising qualitative results, their complexity makes them far too computationally expensive for real-time rendering.

The present embodiments generally relate to enhancing a quality of denoising in a real-time pathtracer (e.g., RedshiftRT). A pathtracer can implement a Monte-Carlo process, which can require many samples to converge to an error-acceptable result. Denoisers are often used in real-time (or near real-time), in order to accelerate the convergence process.

The present embodiments further comprise systems and methods relating to an adaptive guidance algorithm to be implemented on top of various denoising algorithms (e.g., SVGF/ASVGF). The systems and methods as described herein can improve the gradient estimation quality, producing less blurry images. The systems and methods can also substantially assist many denoising algorithms in complicated illumination scenarios, which are common in CADs, such as indirect illuminated normal maps, specular paths, sharp specular reflections/refractions, very noisy direct illumination like dome lights or specular-specular sub-paths, sub surface scattering, hair, etc.

Figure 1B:
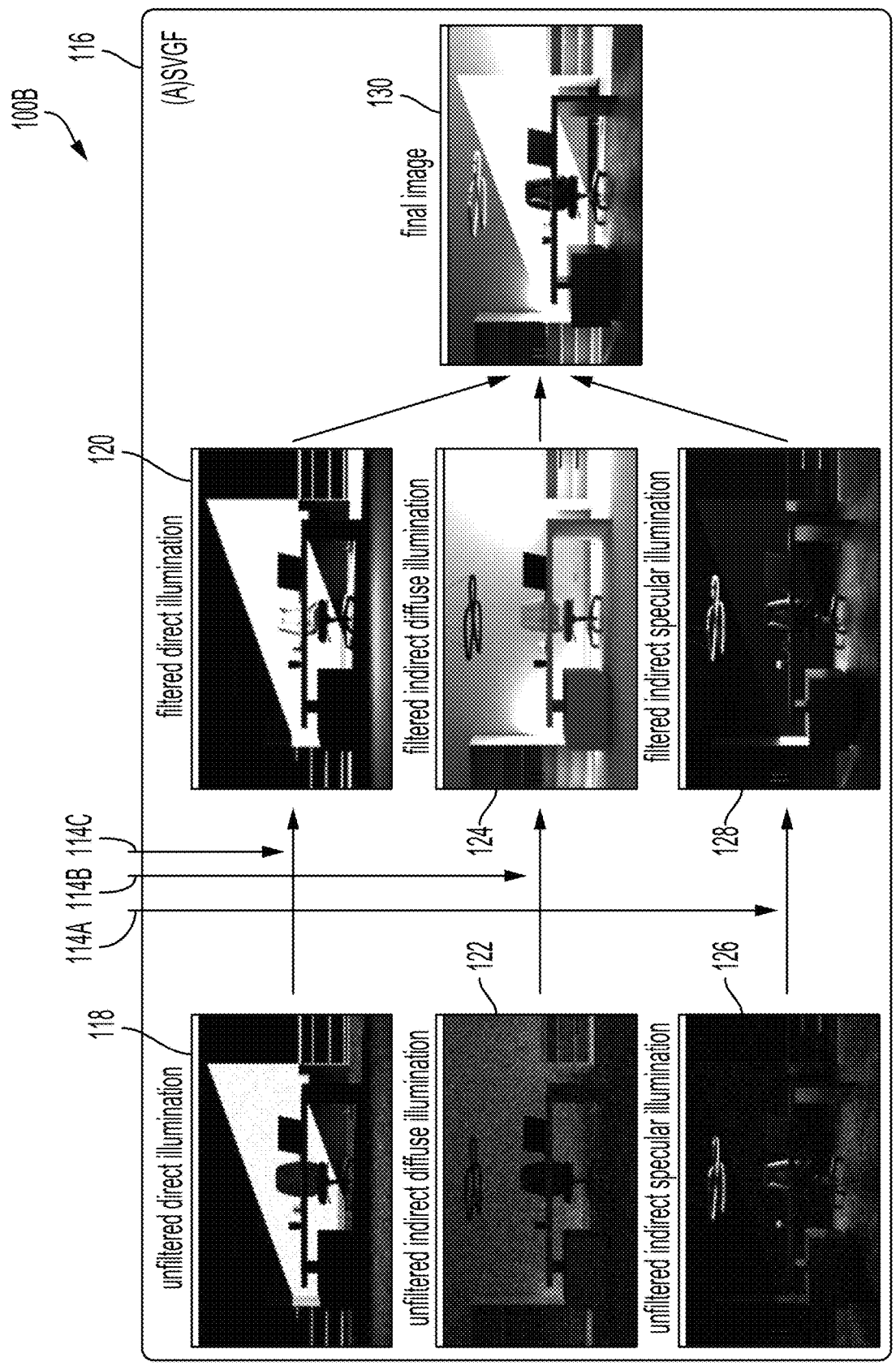

FIGS. 1A-B illustrates a process 100a, 100b for rendering a final image by a filtering algorithm and a guidance algorithm. As shown in FIGS. 1A and 1B, a series of unfiltered images can be filtered using a guidance algorithm to filter the image and generate a final image. Further, a guidance algorithm (or a guidance process, module, or node) executing on one or more computing nodes can interact with a filtering algorithm (or a filtering process, module, or node) (e.g., (A)SVGF) to provide guidance in filtering a rendering to render a final image.

At the filtering process 116, a series of unfiltered illuminations to be rendered (e.g., unfiltered direct illumination 118, unfiltered indirect diffuse illumination 122, unfiltered indirect specular illumination 126) can be provided. Further, the filtering process 116 can filter these illuminations to generate filtered illuminations (e.g., filtered direct illumination 120, filtered indirect diffuse illumination 124, and filtered indirect specular illumination 128).

As shown in FIGS. 1A-1B, the guidance process 102 can interact with the filtering process 116. For instance, the guidance process 102 can use features such as a surface and micro-surface normal 104, object ID image 108, roughness image 106, position derivative image 110 to generate a guidance map 112. The guidance map 112 can control the level of moderation of the variance-based filtering performed by the filtering process. For instance, the guidance map 112 can be provided to the filtering process 116 (e.g., via arrows 114A-C) for filtering the unfiltered illuminations (to generate the filtered illuminations). The filtered illuminations can be combined for generating the final image.

The contents of the filtering process can summarily depict a filtering (e.g., (A-)SVGF) algorithm. Here, the initial unfiltered direct/indirect diffuse/indirect specular terms can be iteratively spatio-temporally filtered with a variance-guided kernel. A variance can decrease over time with new samples, and, with enough samples, the final image can be converged to a biased but realistic result.

The contents of the guidance process can depict a guidance algorithm, where a guidance map can be constructed from a series of features, such as microsurface normals, topology normals, roughness, materialIDs, material type, and position derivatives.

The guidance map can also be constructed using a history confidence metric, which describes the reliability of using partially converged results from previously rendered temporally adjacent camera views. The history confidence metric can be used to save temporal information even at the boundary of temporal disocclusion events.

The guidance map can also be specialized to behave differently for specific materials, such as sub surface scattering or hair. Sub surface scattering can benefit from over-blurring, whereas hair can benefit from a more conservative filtering profile. The material type parameter can be used to provide an easy way for users to control the denoiser guidance mechanism.

The guidance map can then be injected into the (A-)SVGF algorithm and can then be used to moderate the spatio-temporally variance-guide kernel, so that it does not over-blur in difficult light transport situations. This way, more detail can be preserved, and the image can converge to a less biased result. In some instances, the guidance map could be improved with the use similarity between the path history of neighbors.

In some instances, various methods can be limited by the fact that only variance and several non-adaptive parameters control the process of filtering. This in turn can make such methods prone to over-blurring. The methods as described herein can reduce these limitations with an adaptive guidance parameter, which can be used together with the variance and the other non-adaptive parameters to guide the rate of blurring. The guidance metric can be constructed by analyzing a spatio-temporal vicinity around the filtered pixel, and by computing four factors: (1) the physical edge factor, (2) the approximated local roughness factor, (3) a history confidence factor, and (4) a material specialization factor. A pixel can denote a potential neighbor and the center can denote the center of the filtered vicinity. The physical edge factor can measure how much a pixel belongs to or is in proximity of an edge in the topological domain. It can be a formulation with an edge-finding function that follows this equation:

$$\text{physical Edge} = \prod_{neighbors} \max$$

$$(\cos(\angle(\text{topology Normal, neighbor. Topology Normal}), 0), \text{ where}$$

$$\text{neighbors} = \{\text{pixel} \in$$

$$\text{spatio temporal vicinity} | dist(\text{pixel. position, center. position}) < \varepsilon\}$$

The only pixels used in computing the physical edge factor may include pixels which are physically linked to the filtered pixel in the center of the filtering kernel. The topology normal may not be the real normal of the filtered pixel, but the normal of the support topology, these values can be identical if no normal map is present. The local roughness factor can be computed with the following equation:

$$\text{local Roughness} = \sum_{surface\,Neighbors} \max$$

$$(1 - \cos(\angle(\text{normal, neighbor, normal}) \cdot e^{-pDist \cdot pPhi \cdot pDerivative} \cdot e^{-rDist \cdot rPhi}, 0)),$$

where $$\text{surface neighbors} = \left\{ \text{pixel} \in \right.$$

$$\text{spatio temporal vicinity} \left| \begin{array}{l} \text{pixel. material } Id = \text{center. material } Id \\ \text{pixel. object } Id = \text{center. object } Id \end{array} \right\}$$

$pDist$ = distance (pixel. position, center. position)

$p$ Derivative = position derivative factor $r Dist$ = distance (pixel. roughness, center. roughness)

$pPhi, rPhi$ = svgf algorithm position and luminance weight

The history confidence factor can be computed by averaging the reprojection quality in a vicinity around a pixel. The reprojection quality of a pixel can be a metric that describes how good the match between the current and previous temporal samples is, giving a score between [0,1] to every temporal reprojection. Then, during the denoiser filtering stage, the history confidence is used to control the filtering weight of neighboring pixels, increasing guidance for pixels with low history confidence and decreasing guidance for pixels with high history confidence.

$$historyConfidence = \frac{\sum_{surfaceNeighbors} \text{neighbor} \cdot reprojConfidence}{num\ surfaceNeighbors},$$

where $reprojConfidence =$ $$\frac{\sum_{pixel\ neighbors} \left\{ \cos(\angle(\text{center} \cdot \text{normal, neighbor} \cdot \text{normal})) \cdot \left(1 - \frac{\text{distance(center} \cdot \text{neighbor})}{maxDistance}\right) \right\}}{num\ pixelNeighbors}$$

$surfaceNeighbors =$

-continued $$\left\{ pixel \in \text{spatio temporal vicinity} \middle| \begin{array}{l} pixel \cdot materialId = center \cdot materialId \\ pixel \cdot objectId = center \cdot objectId \end{array} \right\}$$

$$pixelNeighbors = \{pixel \in \text{spatial vicinity}\}$$

The material factor is a specialization for certain materials that can benefit from the guidance mechanism. Hair and sub surface scattering materials can be good examples of such specializations, hair can use a more conservative guidance, so that over blurring doesn't take place, whereas sub surface scattering can benefit from aggressive blurring, so an increased guidance factor can lead to much faster convergence to a plausibly realistic result. The material factor can be a user-controlled constant. For sub surface scattering a well-chosen material factor can lead to substantial convergence speed improvements, by using the denoiser filtering and color diffusion properties to accelerate the light scattering.

The final guidance factor can be computed as:

$$\text{guidance} = \text{local Roughness} \cdot \text{physical Edge} \cdot (1 - \text{history Confidence}) \cdot \text{material Factor}$$

The guidance value can then be used to finely control the filtering process, with specializations for every type of signal: direct/indirect diffuse/indirect specular. For example, the SVGF weights can be dynamically adjusted for indirect diffuse illumination:

$$phi\ \text{Normal} = phi\ \text{Normal} * (1 + \text{guidance} * 0.9)$$

$$phi\ \text{Luminance} = phi\ \text{Luminance} * (1 - \text{guidance} * 0.9)$$

The filtering can be both variance and guidance controlled. In this case, both the normal and luminance filtering can be variance guided (SVGF property), but they can also be stricter, directly proportional to the injected guidance property. The implementation can make use of many such practical optimizations, where all phi factors that go into SVGF can be moderated with guidance-based math.

FIGS. 2A-2B illustrate a first example image with 200*a* and without guiding 200*b* as described herein. FIGS. 3A-3B illustrate a second example image with 300*a* and without guiding 300*b* as described herein. FIGS. 4A-4B illustrate a third example image with 400*a* and without guiding 400*b* as described herein. FIGS. 5A-5B illustrate a fourth example image with 500*a* and without guiding 500*b* as described herein.

In some embodiments, a computer-implemented method is provided. The computer-implemented method can include obtaining an initial image rendering to be processed to render a final image. The method can also include processing, by a filtering process, the initial image rendering to generate a series of unfiltered illuminations of the initial image rendering.

The method can also include processing, by a guidance process, the initial image rendering to generate a series of the features of the initial image rendering. In some instances, the features can comprise any of: surface and microsurface normals, a roughness, an object identifier, a material type, and a position derivative.

In some instances, the guidance map is configured to support a high quality indirect illumination of one or more microsurfaces, as the guidance map is configured to signal that a high variance of any of the one or more microsurfaces does not need to be overblurred. In some instances, the guidance map is configured to prevent overbluring of domelights and other low quality direct illumination sources. In some instances, the guidance map is configured to be disabled and enabled.

The method can also include generating a guidance map for the initial image rendering based on the series of features. The guidance map can control a level of moderation of variance-based filtering. In some instances, the variance-based filtering comprises adaptive spatiotemporal variance-guided filtering (A-SVGF).

The method can also include performing a variance-based filtering to the series of unfiltered illuminations using the guidance map to generate a series of filtered illuminations. In some instances, the series of unfiltered illuminations and/or the filtered illuminations comprise any of: a direct illumination, an indirect diffuse illumination, and an indirect specular illumination.

The method can also include combining the series of filtered illuminations to generate the final image. In some instances, the final image filtered using the guidance map comprises a lower blurriness and higher accuracy relating to any final image filtered without using the guidance map.

In another example embodiment, a system is provided. The system can include one or more processors and one or more non-transitory processor readable storage devices comprising instructions which, when executed by the one or more processors, cause the one or more processor to perform operation. The operations can include generating a guidance map of an initial image rendering. The operations can also include filtering the initial image rendering to generate a final image using the guidance map.

In another example embodiment, one or more non-transitory computer-readable media is provided. The one or more non-transitory computer-readable media can comprise instructions which, when executed by one or more processors, cause the one or more processors to perform operations according to any of the embodiments as described herein.

Network Examples

Figure 6:
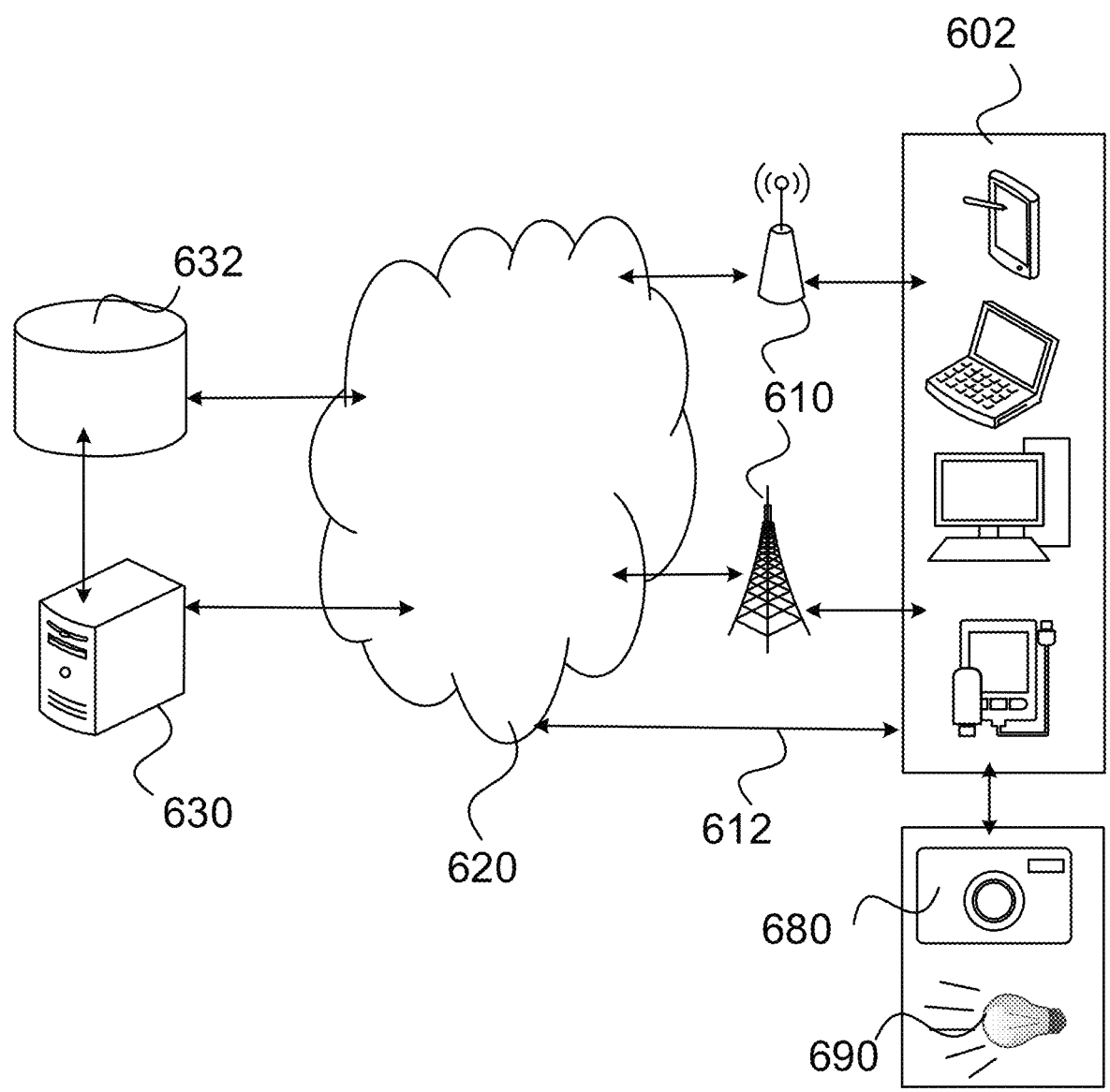
FIG. 6 is an illustration of an example networked system in accordance with certain aspects described herein.

An example of a networked computing arrangement which may be utilized here is shown in FIG. 6. The computer 602 could be any number of kinds of computers alone or in combination such as those included with the camera itself, the light source itself, and/or another computer arrangement in communication with the camera and/or light computer components and in some examples, the stage motors and/or camera lens motors, including but not limited to a laptop, desktop, tablet, phablet, smartphone, or any other kind of device used to process and transmit digitized data. Such a computer 602 may be used to control a camera 680 and/or light generating device 690 as described herein.

Turning back to FIG. 6, computer resources for any aspect of the system may reside in networked or distributed format over the network 620. Further, the data captured for the pixelated image from whichever computer 602 may be transmitted to a back end computer 630 and associated data storage 632 for saving and analysis. In some examples, the transmission may be wireless 610 by a cellular or WiFi transmission with associated routers and hubs. In some examples, the transmission may be through a wired connection 612. In some examples, the transmission may be through a network such as the internet 620 to the back end server computer 630 and associated data storage 632. At the back end server computer 630 and associated data storage 632, the pixelated image data may be stored, analyzed, compared to previously stored image data for matching, or any other kind of image data analysis. In some examples, the storing, analyzing, and/or processing of image data may be accomplished at the computer 602 which is involved in the original image capture. In some examples, the data storing, analyzing, and/or processing may be split between the local computer 602 and a back end computing system 630. Networked computer resources 630 may allow for more data processing power to be utilized than may be otherwise available at the local computers 602. In such a way, the processing and/or storage of image data may be offloaded to compute resources that are available on the network. In some examples, the networked computer resources 630 may be virtual machines in a cloud infrastructure. In some examples, the networked computer resources 630 may be spread across many multiple computer resources by a cloud infrastructure. The example of a single computer server 630 is not intended to be limiting and is only one example of a compute resource that may be utilized by the systems and methods described herein.

Example Computer Devices

As described, any number of computing devices may be arranged into or connected with the various component parts of the systems described herein. For example, the camera systems may include their own computing systems, the lighting systems may include their own computing systems, the data from the camera images may be collected, stored and analyzed using computing systems. Such systems may be local and in direct connection with the systems described herein, and in FIG. 6. In some examples, some of the computing resources may be networked, or in communication over a network, such that they are not necessarily co-located with the optics systems described herein. In any case, any of the computing systems used here may include component parts such as those described in FIG. 7.

Figure 7:
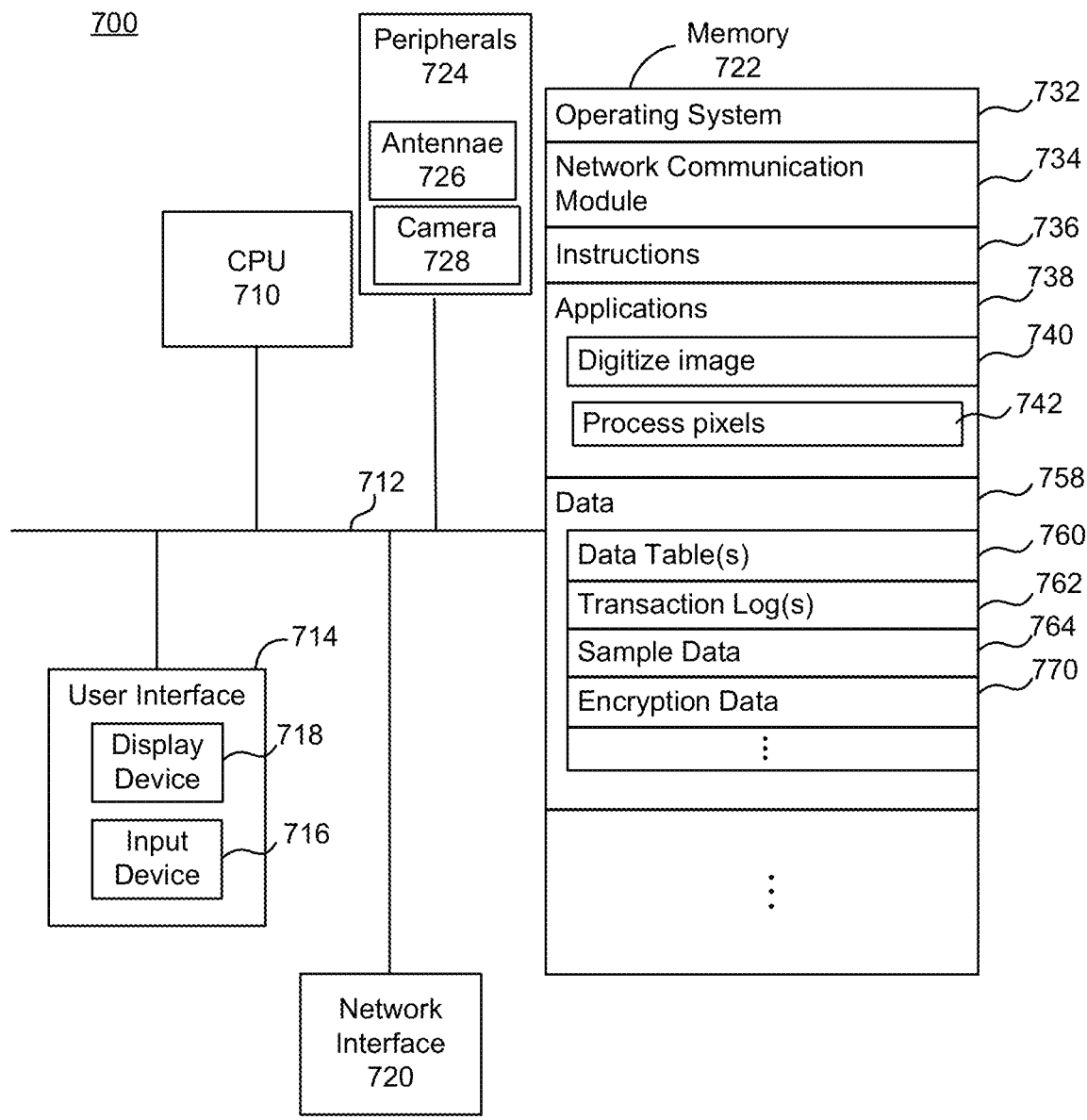
FIG. 7 is an illustration of an example computer system in accordance with certain aspects described herein.

FIG. 7 shows an example computing device 700 which may be used in the systems and methods described herein. In the example computer 700 a CPU or processor 710 is in communication by a bus or other communication 712 with a user interface 714. The user interface includes an example input device such as a keyboard, mouse, touchscreen, button, joystick, or other user input device(s). The user interface 714 also includes a display device 718 such as a screen. The computing device 700 shown in FIG. 7 also includes a network interface 720 which is in communication with the CPU 720 and other components. The network interface 720 may allow the computing device 700 to communicate with other computers, databases, networks, user devices, or any other computing capable devices. In some examples, the method of communication may be through WiFi, cellular, Bluetooth Low Energy, wired communication, or any other kind of communication. In some examples, the example computing device 700 includes peripherals 724 also in communication with the processor 710. In some examples, peripherals include antennae 726 used for communication. In some examples peripherals 724 may include camera equipment 728. In some example computing device 700 a memory 722 is in communication with the processor 710. In some examples, this memory 722 may include instructions to execute software such as an operating system 732, network communications module 734, other instructions 736, applications 738, applications to digitize images 740, applications to process image pixels 742, data storage 758, data such as data tables 760, transaction logs 762, sample data 764, encryption data 770 or any other kind of data.

Conclusion

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A computer-implemented method comprising:
obtaining an initial image rendering to be processed to render a final image, wherein the initial image rendering includes information relating to unfiltered illuminations and features;
generating a guidance map for the initial image rendering based on the features, the guidance map controlling a level of moderation of variance-based filtering;
performing a variance-based filtering to the unfiltered illuminations using the guidance map to generate filtered illuminations; and
combining the filtered illuminations to generate the final image.

2. The computer-implemented method of claim 1, wherein the features comprise any of: surface and microsurface normals, a roughness, an object identifier, a material type, and a position derivative.

3. The computer-implemented method of claim 1, wherein the variance-based filtering comprises adaptive spatiotemporal variance-guided filtering (A-SVGF).

4. The computer-implemented method of claim 1, wherein the unfiltered illuminations and/or the filtered illuminations comprise any of: a direct illumination, an indirect illumination, and an indirect specular illumination.

5. The computer-implemented method of claim 1, wherein the final image filtered using the guidance map comprises a lower blurriness relating to any final image filtered without using the guidance map.

6. The computer-implemented method of claim 1, wherein the guidance map is configured to support a high-quality indirect illumination of one or more microsurfaces, as the guidance map is configured to signal that a high variance of any of the one or more microsurfaces does not need to be overblurred.

7. The computer-implemented method of claim 1, wherein the guidance map is configured to prevent over-blurring of dome-lights and other low quality direct illumination sources.

8. The computer-implemented method of claim 1, wherein the guidance map is configured to be disabled and enabled.

9. The computer-implemented method of claim 1, wherein the guidance map is configured to speed up a convergence rate of sub surface scattered materials.

10. A system comprising:
one or more processors;
one or more non-transitory processor readable storage devices comprising instructions which, when executed by the one or more processors, cause the one or more processor to perform operations comprising:
obtaining an initial image rendering that includes information relating to unfiltered illuminations and features, wherein the features comprise any of: surface and microsurface normals, a roughness, an object identifier, a material type, and a position derivative;
generating a history quality metric based on the features;
generating a guidance map for the initial image rendering based on the features and on the history quality metric, the guidance map controlling a level of moderation of variance-based filtering;
performing a variance-based filtering to the unfiltered illuminations using the guidance map to generate filtered illuminations; and
combining the filtered illuminations to generate a final image.

11. The system of claim 10, wherein the variance-based filtering comprises adaptive spatiotemporal variance-guided filtering (A-SVGF).

12. The system of claim 10, wherein the unfiltered illuminations and/or the filtered illuminations comprise any of: a direct illumination, an indirect illumination, and an indirect specular illumination.

13. The system of claim 10, wherein the final image filtered using the guidance map comprises a lower blurriness relating to any final image filtered without using the guidance map.

14. The system of claim 10, wherein the guidance map is configured to support a high-quality indirect illumination of one or more microsurfaces, as the guidance map is configured to signal that a high variance of any of the one or more microsurfaces does not need to be overblurred.

15. The system of claim 10, wherein the guidance map is configured to prevent overblurring of dome-lights and other low quality direct illumination sources.

16. The system of claim 10, wherein the guidance map is configured to be disabled and enabled.

17. The system of claim 10, wherein the guidance map is configured to speed up a convergence rate of sub surface scattered materials.

18. One or more non-transitory computer-readable media comprising instructions which, when executed by one or more processors, cause the one or more processors to perform operations including:
obtaining an initial image rendering to be processed to render a final image, wherein the initial image rendering includes information relating to unfiltered illuminations and features;
generating a history quality metric based on the features;
generating a guidance map for the initial image rendering based on the features and the history quality metric, the guidance map controlling a level of moderation of variance-based filtering;
performing a variance-based filtering to the unfiltered illuminations using the guidance map to generate filtered illuminations; and
combining the filtered illuminations to generate the final image.

19. The one or more non-transitory computer-readable media of claim 18, wherein the unfiltered illuminations and/or the filtered illuminations comprise any of: a direct illumination, an indirect illumination, and an indirect specular illumination.

20. The one or more non-transitory computer-readable media of claim 18, wherein the final image filtered using the guidance map comprises a lower blurriness relating to any final image filtered without using the guidance map.

* * * * *